United States Patent
Zhu et al.

(10) Patent No.: US 7,833,659 B2
(45) Date of Patent: Nov. 16, 2010

(54) WINDING ASSEMBLY TYPE LITHIUM ION SECONDARY POWER BATTERIES

(75) Inventors: Jianhua Zhu, Shenzhen (CN); Xi Shen, Shenzhen (CN); Qing Lai, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 711 days.

(21) Appl. No.: 11/271,684

(22) Filed: Nov. 10, 2005

(65) Prior Publication Data

US 2006/0110658 A1  May 25, 2006

(30) Foreign Application Priority Data

Nov. 11, 2004   (CN) .................... 2004 2 0095240 U

(51) Int. Cl.
*H01M 2/10* (2006.01)
*H01M 6/10* (2006.01)
*H01M 2/14* (2006.01)
*H01M 10/16* (2006.01)

(52) U.S. Cl. .................... 429/186; 429/94; 429/129; 429/208

(58) Field of Classification Search .................... None
See application file for complete search history.

(56) References Cited

U.S. PATENT DOCUMENTS

| | | | | |
|---|---|---|---|---|
| 3,844,841 A | * | 10/1974 | Baker | 429/90 |
| 3,986,894 A | * | 10/1976 | Ciliberti, Jr. | 429/153 |
| 4,357,398 A | * | 11/1982 | Nelson et al. | 429/94 |
| 6,444,353 B1 | * | 9/2002 | Takaki et al. | 429/120 |
| 2003/0031920 A1 | * | 2/2003 | Hoffman et al. | 429/66 |

* cited by examiner

*Primary Examiner*—Dah-Wei D Yuan
*Assistant Examiner*—Kwang Han
(74) *Attorney, Agent, or Firm*—Venture Pacific Law, PC

(57) ABSTRACT

A type of winding assembly type lithium ion secondary power battery includes: winding assembly type electrode cores wound with positive electrodes, negative electrodes and a separation membrane, electrolyte, and a battery shell. Its characteristics are: the interior of the battery shell carries at least one electrode units formed by electrode holders holding many stacked electrode cores. The terminal leads of the current collector for all positive and negative electrode cores are led from the upper and lower ends of the electrode unit respectively. The positive and negative terminals on cover boards and the outer side of the cover boards are connected to terminal leads of the current collector by built-in fasteners. There is a separation ring between the electrode core body of the battery and the cover boards of the battery. The present invention simplifies the manufacturing technology, increases the energy density of the battery, the mechanical property and safety property of the battery, and has an excellent high discharge property.

16 Claims, 3 Drawing Sheets

(a)     (b)

(a) (b) (c) (d)

(a) (b)

WINDING ASSEMBLY TYPE LITHIUM ION SECONDARY POWER BATTERIES

CROSS REFERENCE

This application claims priority from a Chinese patent application entitled "Winding Assembly Lithium Ion Secondary Power Batteries" filed on Nov. 11, 2004, having a Chinese Application No. 200420095240.6. This application is incorporated herein by reference.

FIELD OF THE INVENTION

This invention relates to lithium ion secondary batteries. Particularly, it relates to lithium ion secondary power batteries using the winding assembly type of electrode plates.

BACKGROUND

At present, lithium ion secondary batteries commonly use a winding assembly structure, where the manufacturing technology is relatively simple for low-capacity batteries. In the research and development of high-capacity, high-power lithium ion batteries, the use of a stacking-plate-distribution structure has started to overcome certain shortcomings such as the long electrode plates, the high winding difficulty, and the small area for heat dissipation. However, the actual manufacturing technology in using this kind of battery structure is relatively complex, difficult to operate, and the product yield needs to be improved. In addition, with the increase in the capacity and volume of the batteries, the safety problems of these batteries are widely recognized and taken seriously. Because batteries would experience drops, vibrations, and other large forces of shock, if the batteries' electrode core moves, damages to the positive and negative electrode plates can happen. This can cause interior short-circuiting of the batteries, and further initiates a series of safety issues such as the heating and explosion of the batteries. China patent CN2433737 disclosed a type of lithium ion power batteries using a stacking-distribution structure for the electrode plates. The two ends of the electrode plates of the batteries are connected and fixed by stainless steel boards or nickel boards. Although in using this kind of structure, to a certain extent, it has some improvements; however, its manufacturing technology is still complex. The weight of the connecting and fixing parts are comparatively large, the raw material and processing cost is very high, and under heavy duty mobile situations, this device is still difficult to be affixed onto the batteries' outer shell, bringing about potential safety problems to the battery. Therefore, it is therefore desirable to have a novel battery structure for holding the electrode cores that is safe and easy to manufacture.

SUMMARY OF THE INVENTION

An object of the present invention is to use winding assembly type electrode cores for lithium ion secondary power batteries in order to have high safety characteristics and excellent high discharge rate.

The winding assembly type of lithium ion secondary power batteries of the present invention include: electrode cores wound with positive electrodes, negative electrodes and a separation membrane (also known as winding assembly type structure), electrolyte, and a battery shell. Its characteristics are: inside the battery shell, there is at least one large electrode group formed by at least one small electrode group, which is formed by a plurality of electrode cores. Terminal leads of the current collectors for all positive and negative electrode cores of the electrode core groups within the electrode units are led from the upper and lower ends respectively. The positive and negative terminals on the cover boards and outer side of the cover boards are connected to the terminal leads of the current collectors for the positive and negative electrodes via fasteners. There are separation rings between the electrode core groups of the batteries and the cover boards of the batteries.

The electrode unit is a box-shaped unit formed with several rectangular electrode holders. The rectangular electrode holders hold in place an electrode core group, which has several electrode cores.

The winding assembly type lithium ion secondary power batteries of the present invention have a scientific design, a reasonable structure, and including the following advantages:

1. Using the winding assembly type of electrode cores alleviates the potential problems arising from the use of large numbers of electrode core plates in traditional stacking type electrode cores. This simplifies the manufacturing technology and improves the shortcomings of batteries using the winding type structure, such as the problems of long electrode plates, winding difficulty, small dissipation area, inconvenient interior heat dissipation of the batteries, and poor high rate discharge properties of the batteries.

2. Using the electrode unit to tightly affix the electrode cores. Because the connection mechanism of the units is extremely simple and convenient, and every single rectangular electrode holder of the units holds an electrode core group, it can ensure the reliable affixation of the electrode cores, effectively preventing movement of the electrode cores. In this manner, the interior short-circuiting of the batteries resulting from the distortion of the positive and negative electrode plates when the batteries fall or vibrate is avoided, improving the mechanical properties of the batteries.

3. The electrode unit is made of light materials such as polyethylene, polypropylene, polyetheramide, alkoxyl fluororesin, or epoxy resin, which are high temperature resistant and stable in batteries. In addition, the manufacturing technology for fabricating the units is simple and convenient, low cost, and has a double insulation effect, which improves the safety properties of the batteries.

4. The terminal leads of the current collectors and the electrode terminals are connected in parallel, which changes the former method of connecting in series where terminal leads of the current collector were required to extend out of the shell and were tightly fixed onto the cover boards. Therefore, the length of the terminal leads of the current collector is significantly shortened, saving effective space in the batteries and improving the energy density of the batteries.

5. Because of using comparatively wider terminal leads of the current collector and a dual electrode terminal structure, the batteries have a large current conduction area and little contact resistance, consequently possessing excellent high rate discharge properties.

The specific structure of the winding assembly type lithium ion secondary power batteries of the present invention is provided by the following figures and detailed embodiments.

DESCRIPTION OF THE CALL-OUTS IN THE FIGURES

1—Electrode core body of the battery; 2—Battery shell; 3—Electrode core; 4—Electrode core group (also referred to as small electrode group); 5—Electrode unit; 6—Rectangular electrode holder; 7—Connecting hole of the holder; 8—Protruding connector; 9—Convex connector; 10—Concave notch; 11—Bar opening; 12—Terminal lead of the current collector; 13—Connecting hole; 14—Cover board; 15—Positive terminal; 16—Negative terminal; 17—Horizontal screw; 18—Horizontal nut; 19—Separation ring; and 20—Large electrode group.

DETAILED DESCRIPTION OF THE PREFERRED EMBODIMENTS

The winding assembly type lithium ion secondary power battery is composed of a battery electrode core body 1, electrolyte and a battery shell 2. Said battery electrode core body 1 is comprised of one or more electrode units 5, each is formed by four electrode holders holding several winding type electrode cores.

Figure 1:
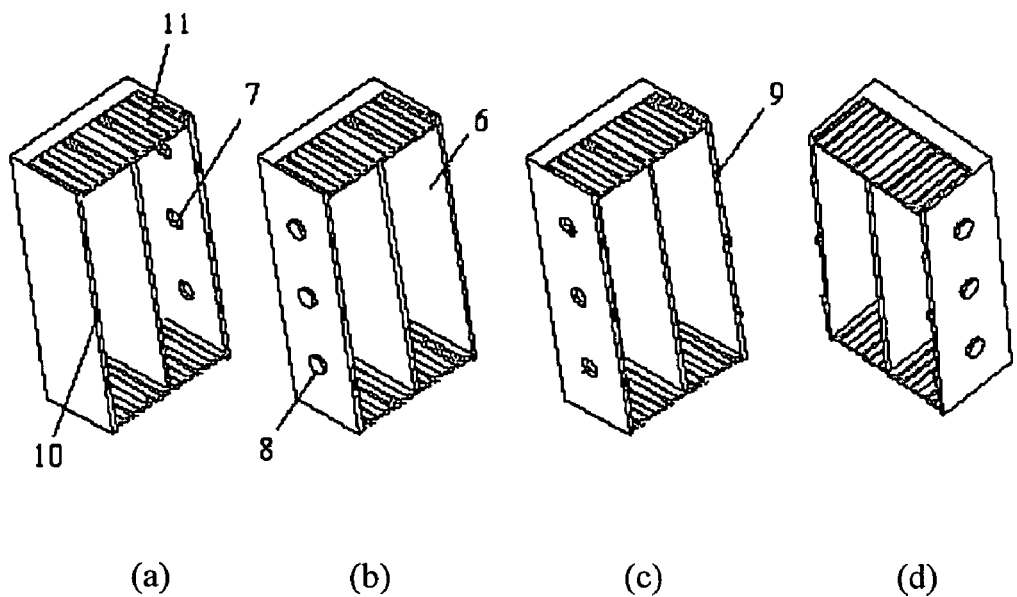
FIG. 1 provides different views of an embodiment of the structure of the electrode unit for the winding assembly type lithium ion secondary power batteries.
Figure 2:
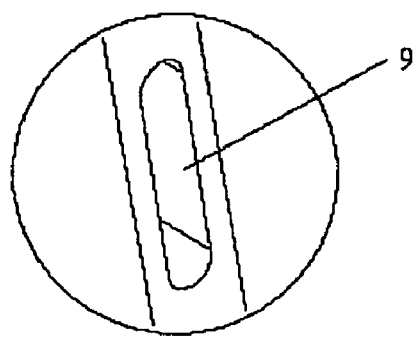
FIG. 2 is a magnified view of the concave notch 9 on the sidewall of the rectangular electrode holder of the electrode unit in FIG. 1.
Figure 3:
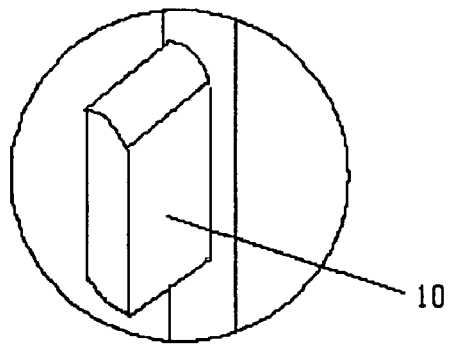
FIG. 3 is a magnified view of the protruding connecting structure 10 at the sidewall of the rectangular electrode holder of the electrode unit in FIG. 1.

Said electrode unit 5 comprises four identical standardized rectangular electrode holders 6 shown in FIG. 1 (a), (b), (c) and (d). On one sidewall of the rectangular electrode holder 6 there are connecting holes 7. On the other side of the rectangular electrode holder 6, there are protruding connectors (or tacks) 8, matching the connecting holes 7 on the sidewall of the rectangular electrode holder 6. On the thin sidewall of all rectangular electrode holders 6, there are convex connector 9 and concave notches 10 (shown in FIGS. 2 and 3) which can be set to match each other. There are bar openings 11 at both ends of the rectangular electrode holder 6. A small electrode group 4 is formed within four rectangular electrode holders 6 respectively. In using the connecting holes 7 on the sidewalls of each of the rectangular electrode holders 6, protruding connectors 8, convex connectors 9, and concave notches 10 to match each other, the rectangular electrode holders 6 encasing the electrode core groups 4, which make up the electrode unit and the ultimately the battery electrode core body 1. The terminal leads 12 of the current collector for the positive and negative electrodes at both ends of all electrode cores 3 are set up within the electrode unit 6 and lead to the parallel bar openings 11 at the upper and lower ends of the electrode unit 5. There are connecting holes 13 on the terminal leads 12 of the current collector for the positive and negative electrodes. The terminal leads 12 of the current collector for the positive and negative electrodes at both ends of the battery electrode core body 1 are divided into two parts. The cover board 14, positive terminal 15 and negative terminal 16 respectively outside the cover board, are integrated with the battery electrode core body 1 by the matched horizontal screw 17, horizontal nut and connecting holes on the terminal leads 12. The battery electrode core body 1 is inserted into a battery shell 2. There is a separation ring 19 between the battery electrode core body 1 and battery cover board 14. The battery shell 2 is injected with electrolyte.

The width ratio of the terminal lead 12 of the current collector for the positive and negative electrodes to the electrode core 3 in this embodiment is set to 0.5.

The electrode unit is composed of several rectangular electrode holders. On one sidewall of the rectangular electrode holder, there are connecting holes. On another sidewall of the rectangular electrode holder, there are protruding connectors, matching the connecting holes on the sidewall of another rectangular electrode holder. The sides of the rectangular electrode holder have these connecting assemblies that match each other. Assembling the rectangular electrode holders by the above described matching structure forms the box-shaped electrode unit. The two units can be tightly connected together by tightening them in the center. The operation is very easy and simple and can effectively hold the electrode cores in position.

After stacking the electrode cores, multiple parallel bar openings located at the upper and lower ends of the electrode holders route the terminal leads of the current collectors after the electrode cores are stacked.

The electrode holders are made of light material having stable physical and chemical properties. It can be made from the following materials: polyethylene, polypropylene, polyetheramide, alkoxyl fluororesin, an epoxy resin, or a composite of multiple materials.

The ratio of the terminal lead of the current collector to the width of the electrode core is between 0.01 and 1, with the preferred embodiment being between 0.25 and 1. At too low of a ratio, the batteries have a smaller current conduction area, which affects the performance of the batteries. At too high of a ratio, the electrode core is difficult to assemble and can easily cause damage to the terminal leads of the current collector.

The fabrication process of the positive electrode plate for the winding assembly type lithium ion secondary power battery in this embodiment is: dissolving the PVDF in NMP solution; adding $LiCoO_2$ and black acetylene into the above solution; mixing uniformly to form a paste, its composition is $LiCoO_2$: acetylene black: PVDF=92:4:4; then evenly coating the above paste on 20 μm of aluminum foil; drying at 120° C.; Flattening and obtaining the 120 μm thick positive electrode plate; then scratching off the coating layer at the edge of the end of the positive electrode plate to expose a 20 mm width of aluminum foil.

The fabrication process for the negative electrode plate is: dissolving the PVDF in NMP solution; adding artificial graphite into the above solution; mixing uniformly to form a paste, its composition is artificial graphite: PVDF=95:5; then evenly coating the paste on 20 μm of copper foil; Drying at 120° C.; flattening and obtaining the 120 μm thick negative electrode plate; then scratching off the coating layer at the edge of the end of the negative electrode plate to expose a 20 mm width of copper foil.

Figure 4:
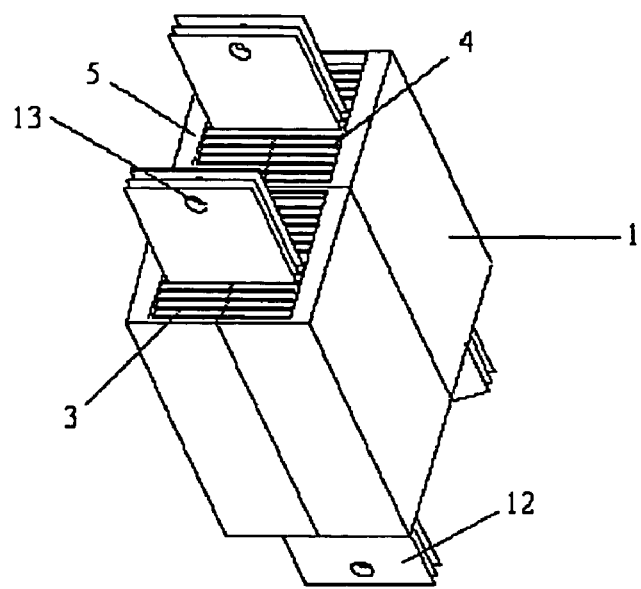
FIG. 4 is a view of the structure of the electrode core body of the winding assembly type lithium ion secondary power batteries.
Figure 5:
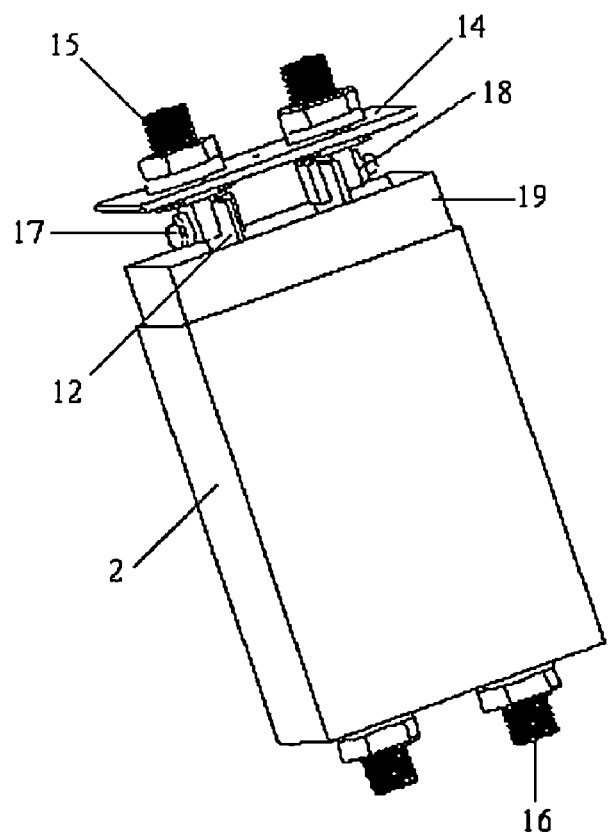
FIG. 5 is another view of the winding assembly type lithium ion secondary power batteries.
Figure 6:
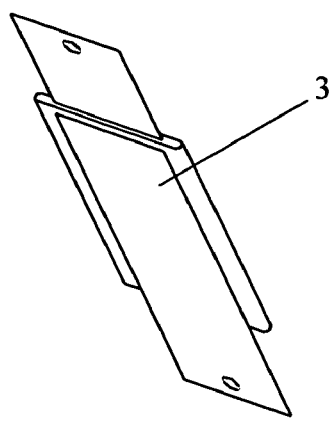
FIG. 6 is an illustration of an electrode core.
Figure 7:
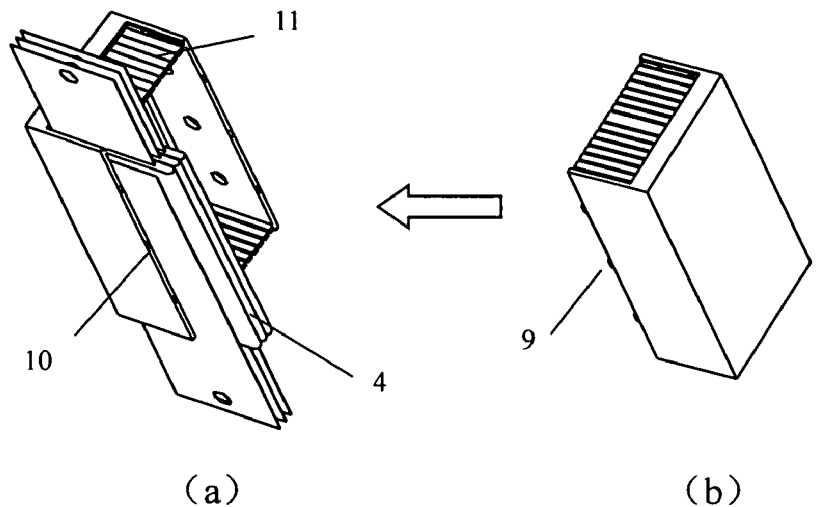
FIGS. 7(a) and 7(b) are illustrations of the assembly of a large electrode group.
Figure 8:
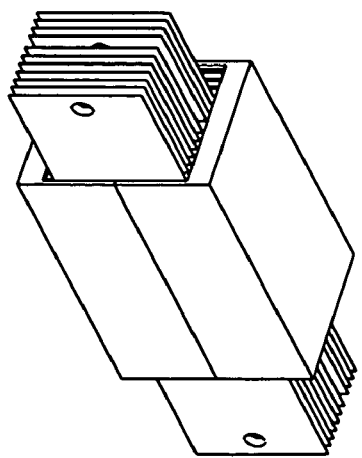
FIG. 8 is an illustration of the large electrode group.

Referring to FIGS. 1-3 and 6-8, the above described positive and negative electrodes are wrapped with micro-pore polypropylene membrane to form an electrode core 3. A plurality of the electrode cores forms the small electrode group 4. Referring to FIG. 7a, in the left and right slots of the rectangular electrode holder, the positive and negative current collectors and terminal leads at each end of each electrode core 3 is routed through the bar opening at the top and bottom of the electrode unit. As illustrated in FIG. 7b, on the thin side walls of the electrode unit, the connecting convex connectors 9 and the connecting concave notches 10 are correspondingly connected to form the large electrode group 20 illustrated in FIG. 8. In using two of the large electrode groups and connecting them using the connecting holes 7 and protruding connectors 8, the electrode core body 1 is formed and is illustrated in FIG. 4.

Winding the above described positive and negative electrode plates and micro-pore polypropylene membrane to obtain the electrode core 3.

After assembling the battery, injecting the electrolyte formed by dissolving $LiPF_6$ at a concentration of 1 mol/dm³ in the solvent mixture of EC/DMC=1:1, into the battery shell; sealing to obtain the 20 Ah lithium ion power battery.

The property tests of the winding assembly type lithium ion secondary power battery of the Embodiment are as follows:

1. Discharge Property Test

Using 0.5 CmA current, the battery is charged to 4.2V. After the voltage reaches 4.2V, charging the battery at a constant voltage; reducing the cut-off current to 0.05 CmA; laying aside for 5 minutes then discharging at a 0.5 CmA current to 3.0V; testing the initial capacity and inner resistance of the battery.

2. High Rate Discharge Property Test

Using 0.5 CmA current, the battery is charged to 4.2V; after the voltage reaching 4.2V, charging the battery at a constant voltage; reducing the cut-off current to 0.05 CmA; laying aside for 5 minutes then discharging at a 10 CmA current to 3.0V; testing the capacity-maintaining rate at a 10 CmA discharging and 0.5 CmA discharging.

3. Anti-Shock Property Test

The battery is placed on the experimental shock test bench. Shock the 2 front and back sides of the battery 20 times each along 3 vertical directions using 10 G peak value acceleration. Testing if circumstances such as a sudden change occurs in the voltage and inner resistance parameters or if short-circuiting occurs.

The test results are shown in the following table:

|  | The Initial Discharging Capacity (Ah) | The Battery's Inner Resistance (mΩ) | $C_{10\,C}/C_{0.5\,C}$ (%) | If the Voltage and Inner Resistance of the Battery Suddenly Change Before and After Shock | If Short-Circuiting Occurs Before and After Shock |
|---|---|---|---|---|---|
| Example | 23 | 1.8 | 86.3 | no | no |

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating and not only the preferred embodiments described herein but all those other and further alterations and modifications as would be apparent to those of ordinary skilled in the art.

We claim:

1. A battery, comprising:

an electrode core body, comprising:

electrode cores, wherein each of said electrode cores having a positive terminal lead and a negative terminal lead;

a plurality of electrode holders comprising a first electrode holder, a second electrode holder, a third electrode holder, and a fourth electrode holder all for fastening said electrode cores, wherein said electrode holders have bar openings on a first end and a second end, wherein the first end and the second end are on opposite ends of the electrode holders, wherein the positive terminal leads are routed through the bar openings on the first end and the negative terminal leads are routed through the bar openings on the second end, wherein the terminal leads extend beyond the enclosure of its respective electrode holders, and wherein the bar openings correspond to the cross-sectional shape and size of its respective terminal leads; and at least one electrode unit formed by said plurality of electrode holders;

electrolyte, wherein two of said electrode holders having right-sided slots and two of said electrode holders having left-sided slots and wherein each one of said electrode holders having right-sided slots is paired with one of said electrode holders having left-sided slots and two of said paired electrode holders forming said electrode unit; and a battery shell for holding the electrode core body and the electrolyte.

2. The battery of claim 1, wherein said electrode cores are winding assembly type electrode cores.

3. The battery of claim 1, wherein said electrode holders are rectangular in shape.

4. The battery of claim 3 wherein the terminal leads of the electrode cores are secured to form a positive terminal and a negative terminal, respectively.

5. The battery of claim 1 wherein the material for the electrode unit can be one or more of the following materials: polyethylene, polypropylene, polyetheramide, alkoxyl fluororesin, and epoxyresin, and wherein the material for the electric holders can be one or more of the following materials: polyethylene, polypropylene, polyetheramide, alkoxyl fluororesin, and epoxyresin.

6. The battery of claim 1, wherein the width ratio of the terminal lead of the electrode core to the electrode core is between 0.01 and 1.

7. The battery of claim 1, wherein the width ratio of the terminal lead of the electrode core to the electrode core is between 0.25 and 1.

8. The battery of claim 1, wherein each of said electrode holders is rectangular in shape;

wherein each of said electrode holders has a first sidewall; and wherein a plurality of protruding connectors are disposed on the first sidewall of the first electrode holder and the third electrode holder, and a plurality of connecting holes are disposed on the first sidewall of the second electrode holder and the fourth electrode holder, wherein the protruding connectors and connecting holes allow the matching of the electrode holders to form the electrode unit.

9. The battery of claim 3,
wherein each of said electrode holders is rectangular in shape;
wherein each of said electrode holders has a first sidewall; and
wherein a plurality of protruding connectors are disposed on the first sidewall of the first electrode holder and the third electrode holder, and a plurality of connecting holes are disposed on the first sidewall of the second electrode holder and the fourth electrode holder, wherein the protruding connectors and connecting holes allow the matching of the electrode holders to form the electrode unit.

10. The battery of claim 9,
wherein each of said electrode holders is rectangular in shape;
wherein each of said electrode holders has a thin sidewall; and
wherein a plurality of concave notches are disposed on the thin sidewall of the first electrode holder and the third electrode holder, and a plurality of convex connectors are disposed on the thin sidewall of the second electrode holder and the fourth electrode holder, wherein the concave notches and the convex connectors allow the matching of the electrode holders to form the electrode unit.

11. A battery, comprising:
an electrode core body, comprising:
    winding assembly type electrode cores, wherein each of said electrode cores having a positive terminal lead and a negative terminal lead;
    a plurality of rectangular electrode holders for holding said electrode cores, wherein the electrode holders have bar openings on a first end and a second end, wherein the first end and the second end are on opposite ends of the electrode holders, wherein the positive terminal leads are routed through the bar openings on the first end and the negative terminal leads are routed through the bar openings on the second end, wherein the terminal leads extend beyond the enclosure of its respective electrode holders, and wherein the bar openings correspond to the cross-sectional shape and size of its respective terminal leads; and
    at least one electrode unit formed by said plurality of electrode holders, wherein two of said electrode holders having right-sided slots and two of said electrode holders having left-sided slots and wherein each one of said electrode holders having right-sided slots is paired with one of said electrode holders having left-sided slots and two of said paired electrode holders forming said electrode unit;
    wherein said plurality of electrode holders comprises a first electrode holder, a second electrode holder, a third electrode holder, and a fourth electrode holder;
    wherein each of said electrode holders has a first sidewall; and
    wherein a plurality of protruding connectors are disposed on the first sidewall of the first electrode holder and the third electrode holder, and a plurality of connecting holes are disposed on the first sidewall of the second electrode holder and the fourth electrode holder, wherein the protruding connectors and connecting holes allow the matching of the electrode holders to form the electrode unit;
electrolyte; and
a battery shell for holding the electrode core body and the electrolyte.

12. The battery of claim 11 wherein the terminal leads of the electrode cores are secured to form a positive terminal and a negative terminal, respectively.

13. The battery of claim 11 wherein the material for the electrode unit can be one or more of the following materials: polyethylene, polypropylene, polyetheramide, alkoxyl fluororesin, and epoxyresin, and wherein the material for the electric holders can be one or more of the following materials: polyethylene, polypropylene, polyetheramide, alkoxyl fluororesin, and epoxyresin.

14. The battery of claim 11, wherein the width ratio of the terminal lead of the electrode core to the electrode core is between 0.01 and 1.

15. The battery of claim 11, wherein the width ratio of the terminal lead of the electrode core to the electrode core is between 0.25 and 1.

16. A battery, comprising:
an electrode core body, comprising:
    winding assembly type electrode cores have positive and negative terminal leads on opposite ends, wherein said positive and negative terminal leads are secured to form positive and negative terminals, respectively;
    a plurality of electrode holders comprising a first electrode holder, a second electrode holder, a third electrode holder, and a fourth electrode holder all for holding said electrode cores;
    wherein the electrode holders have bar openings on a first end and a second end, wherein the first end and the second end are on opposite ends of the electrode holders, wherein the positive terminal leads are routed through the bar openings on the first end and the negative terminal leads are routed through the bar openings on the second end, wherein the terminal leads extend beyond the enclosure of its respective electrode holders, and wherein the bar openings correspond to the cross-sectional shape and size of its respective terminal leads;
    wherein the electrode holders is made of light material having good physical and chemical stabilities from one or more of the following materials: polyethylene, polypropylene, polyetheramide, alkoxyl fluororesin, and epoxyresin,
    wherein the material for the electric holders can be one or more of the following materials: polyethylene, polypropylene, polyetheramide, alkoxyl fluororesin, and epoxyresin;
    wherein each of said electrode holders has a first sidewall; and
    wherein a plurality of protruding connectors are disposed on the first sidewall of the first electrode holder and the third electrode holder, and a plurality of connecting holes are disposed on the first sidewall of the second electrode holder and the fourth electrode holder, wherein the protruding connectors and connecting holes allow the matching of the electrode holders to form the electrode unit;
    at least one of said electrode unit formed by said plurality of electrode holders, wherein two of said electrode holders having right-sided slots and two of said electrode holders having left-sided slots and wherein each one of said electrode holders having right-sided slots is paired with one of said electrode holders having left-sided slots and two of said paired electrode holders forming said electrode unit;

electrolyte; and a battery shell for holding the electrode core body and the electrolyte.

* * * * *